(12) United States Patent
Kagalwala et al.

(10) Patent No.: US 6,990,499 B2
(45) Date of Patent: *Jan. 24, 2006

(54) MAPPING DATABASE USERS TO OPERATING SYSTEM USERS IN A COMPUTER SCHEMA

(75) Inventors: Raxit A. Kagalwala, Issaquah, WA (US); David P. Wohlferd, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 65 days.

This patent is subject to a terminal disclaimer.

(21) Appl. No.: 10/966,177

(22) Filed: Oct. 15, 2004

(65) Prior Publication Data

US 2005/0050081 A1    Mar. 3, 2005

Related U.S. Application Data

(63) Continuation of application No. 09/789,328, filed on Feb. 20, 2001, now Pat. No. 6,816,869.

(60) Provisional application No. 60/249,696, filed on Nov. 17, 2000.

(51) Int. Cl.
*G06F 17/30* (2006.01)

(52) U.S. Cl. ................ 707/103 R; 707/200; 707/104.1

(58) Field of Classification Search ............ 707/103 R, 707/100–104.1, 200–205, 103 X
See application file for complete search history.

(56) References Cited

U.S. PATENT DOCUMENTS

| | | | |
|---|---|---|---|
| 5,569,207 A | 10/1996 | Gisselberg et al. | |
| 5,596,745 A | 1/1997 | Lai et al. | |
| 5,692,129 A | 11/1997 | Sonderegger et al. | |
| 5,794,030 A | 8/1998 | Morsi | |
| 5,937,409 A | 8/1999 | Wetherbee | |
| 5,956,725 A | 9/1999 | Burroughs et al. | |
| 5,956,730 A | 9/1999 | Burroughs et al. | |
| 6,081,808 A | 6/2000 | Blackman et al. | |
| 6,085,198 A | 7/2000 | Skinner et al. | |
| 6,125,363 A | 9/2000 | Buzzeo et al. | |
| 6,134,559 A | 10/2000 | Brumme et al. | |
| 6,157,928 A | 12/2000 | Sprenger et al. | |
| 6,163,776 A | 12/2000 | Periwal | |
| 6,170,005 B1 | 1/2001 | Meandzija | |
| 6,243,709 B1 | 6/2001 | Tung | |
| 6,289,339 B1 | 9/2001 | Weber | |
| 6,317,748 B1 * | 11/2001 | Menzies et al. | 707/103 X |
| 6,330,555 B1 | 12/2001 | Weber | |
| 6,374,252 B1 | 4/2002 | Althoff et al. | |
| 6,374,253 B1 | 4/2002 | Weider et al. | |
| 6,374,256 B1 | 4/2002 | Ng et al. | |
| 6,405,202 B1 | 6/2002 | Britton et al. | |
| 6,493,719 B1 * | 12/2002 | Booth et al. | 707/103 X |
| 6,496,833 B1 | 12/2002 | Goldberg et al. | |
| 6,569,207 B1 | 5/2003 | Sundaresan et al. | |

(Continued)

*Primary Examiner*—Charles Rones
*Assistant Examiner*—Neveen Abel-Jalil
(74) *Attorney, Agent, or Firm*—Lee & Hayes, PLLC

(57) ABSTRACT

Described above is a schema extension of the Common Information Model (CIM), designed to model manageable aspects of a database server such as a Structure Query Language (SQL) server. The database schema contains a view of user-related classes of the operating system schema. These classes are in a different namespace than the database schema. The database schema includes associations between its user-related classes and the user-related classes of the operating system. These associations map database users to operating system users.

8 Claims, 3 Drawing Sheets

U.S. PATENT DOCUMENTS

| | | |
|---|---|---|
| 6,571,232 B1 | 5/2003 | Goldberg et al. |
| 6,816,869 B2 * | 11/2004 | Kagalwala et al. ..... 707/103 R |
| 2002/0059293 A1 * | 5/2002 | Hirsch .................... 707/103 R |
| 2002/0107872 A1 * | 8/2002 | Hudis et al. ............. 707/104.1 |
| 2002/0116385 A1 | 8/2002 | Kagalwala et al. |
| 2002/0156790 A1 * | 10/2002 | Kagalwala et al. ......... 707/100 |

* cited by examiner

MAPPING DATABASE USERS TO OPERATING SYSTEM USERS IN A COMPUTER SCHEMA

RELATED APPLICATIONS

This application claims priority to U.S. patent application Ser. No. 09/789,328, filed Feb. 20, 2001 now U.S. Pat. No. 6,816,869, which claims priority to U.S. Provisional Application No. 60/249,696, filed Nov. 17, 2000.

TECHNICAL FIELD

This invention relates to databases, database management systems, and database management schemas.

BACKGROUND

Database management systems (DBMS) are core components of virtually every enterprise (e-business) application. The ability to effectively configure, monitor, and manage a DBMS is critical to the success of enterprise applications.

Most DBMSs are designed for compatibility with relational databases. A relational database comprises a plurality of tables. Each table has a plurality of data records (rows) and each table includes a definition of the fields (columns) that the records will contain. A relational database includes the specification of relationships between fields of different tables. A DBMS performs common management tasks such as creating databases, adding tables, replication management, data backup, etc.

The Desktop Management Task Force (DMTF) Common Information Model (CIM) is an approach to the management of systems, software, users, and networks that applies the basic structuring and conceptualization techniques of the object-oriented paradigm. More specifically, the purpose of CIM is to model various computer-related systems—both hardware and software. It is important to recognize that object-oriented modeling is different from object-oriented programming.

This type of modeling uses schemas to represent systems. A schema is an abstraction of something that exists in the real world. Generally, a schema comprises a collection of classes and associations.

A class models a set of objects that have similar properties and fulfill similar purposes. In a database management schema, for example, individual classes might define such things as files, users, tables, etc.

Classes follow a hierarchical structure. Classes can have subclasses, also referred to as specialization classes. The parent class of a subclass is referred to as a superclass or a generalization class. A class that does not have a superclass is referred to as a base class.

A typical schema might comprise a collection of different schemas, which in this case can also be referred to as subschemas. Such subschemas are often located in various different namespaces. A namespace is simply a way to logically group related data. Within a given namespace, all names are unique. Within the following disclosure, the terms "schema" and subschema are used interchangeably.

A subclass inherits properties of its superclass. All properties and methods of a superclass apply to the subclass.

It is conventional to represent a class by a rectangle containing the name of the class. FIG. 1 shows an example. A class with properties is represented by a rectangle divided into two regions as in FIG. 2, one containing the name of the class and the other a list of properties. Inheritance, or a subclass/superclass relationship, is represented by a line drawn between the subclass and the superclass, with an arrow adjacent to the superclass indicating the superclass. Lines representing inheritance are shown in FIG. 3, indicated by reference numeral 10.

Classes contain instances that are collections of values that conform to the type established by the class. Instances are identified by keys that are unique within the class. In other words, no two instances in the same class in the same namespace may have the same values for all of their key values. The term "object" may be used to refer to either an instance or a class.

An association represents a relationship between two or more objects. More specifically, an association is a mechanism for providing an explicit mapping between classes. Associations can be within a namespace or across namespaces. Associations are conventionally shown as a line between two classes, as indicated by reference number 12 in FIG. 3.

CIM schemas describe the gamut of managed elements: servers and desktops (operating systems, components, peripherals, and applications, all layers of the network (from Ethernet switches to IP and HTTP connections), and even end-users. Schema properties model the attributes that apply to objects, such as the type of printer or storage medium, RAM and CPU capacity, storage capacity, etc.

The discussion above gives a general overview of object-oriented modeling and CIM. Please refer to Winston Vumpus, John W. Sweitzer, Patrick Thompson, Andrea R. Westerinin, and Raymond C. Williams; *Common Information Model*, John Wiley & Sons, Inc., New York (2000) for further information regarding CIM. Also refer to Common Information Model (CIM) Specification, V2.0, Mar. 3, 1998, available from the Distributed Management Taskforce. DMTF has a number of other resources on its Internet web site.

SUMMARY

Described below is a system management schema that incorporates an operating system schema or subschema and a database schema or subschema. Within the system management schema, the database schema is in its own namespace and includes several classes, the most pertinent classes comprising an account superclass, a user class, and a login class. The operating system schema resides in another namespace within the system management schema. The operating system schema includes an account superclass, a user account subclass, and a group account subclass.

Associations are made between the database login class and the operating system account subclasses. This allows database users to be mapped to operating system users.

DETAILED DESCRIPTION

The following description sets forth a specific embodiment of a portion of a computer system management schema. This embodiment incorporates elements recited in the appended claims. The embodiment is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Figure 1:
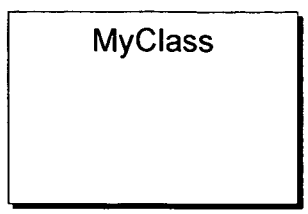
FIGS. 1–3 illustrate CIM drawing conventions.
Figure 2:
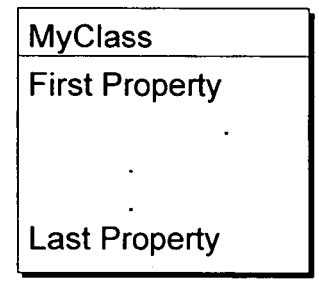
Figure 3:
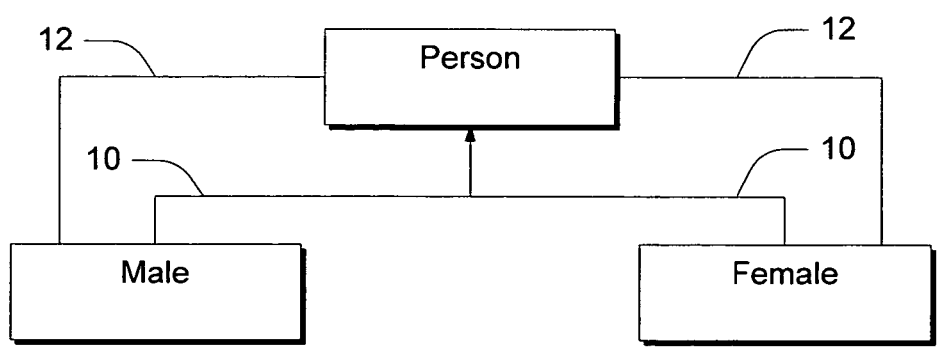
Figure 4:
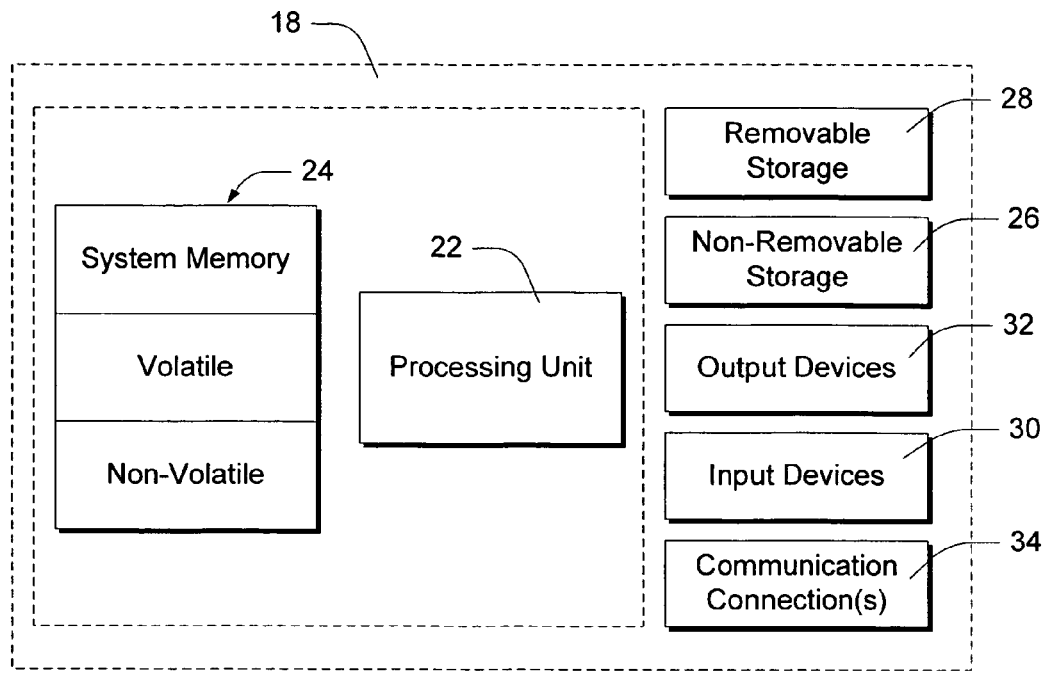
FIG. 4 is a block diagram showing components of a typical computer.

FIG. 4 illustrates an example of a suitable operating environment 18 in which the invention may be implemented. The operating environment 18 is a computer, which is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor system, programmable consumer electronics, network PCs, minicomputers, mainframe computers, distributed computing environments that include any of the above systems or devices, and the like.

The functionality of the computer is embodied in many cases by computer-executable instructions, such as program modules, that are executed by the computer. Generally, program modules include routines, programs, objects, components, data structures, etc. that perform particular tasks or implement particular abstract data types. Tasks might also be performed by instructions from remote processing devices that are linked through a communications network. In a distributed computing environment, program modules may be located in both local and remote computer storage media 28.

Computer 18 typically includes a variety of computer-readable media. Computer-readable media can be any available media that can be accessed by computer 18 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, is digital versatile disks (DVD) or other optical disk storage, magnetic cassettes, magnetic tape, magnetic disk storage or other magnetic storage devices, or any other medium which can be used to store the desired information and which can be accessed by computer 18. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The instructions and/or program modules reside at different times in the various computer-readable media available to the computer. Programs are typically distributed on some type of removable and/or remote media, or by a server on some form of communication media. From there, they are installed or loaded into the secondary disk memory of a computer. At execution, they are loaded at least partially into the computer's primary electronic memory. The invention described herein includes these and other various types of computer-readable media when such media contain instructions programs, and/or modules for implementing the operations described below in conjunction with a microprocessor or other data processors. The invention also includes the computer itself when programmed according to the operations described below.

For purposes of illustration, programs and other executable program components in are illustrated in FIG. 4 as discrete blocks, although it is recognized that such programs and components reside at various times in different storage components of the computer, and are executed by the data processor(s) of the computer.

As shown in FIG. 4, computer 18 typically includes a processing unit 22 and internal computer-storage media 24. The computer may also have other non-removable storage 26 and removable storage 28. Device 20 may have input/output devices 30 and 32 such as a keyboard, mouse, stylus, display device, sound card, etc. In addition, the device might include network connections 34 to other devices, computers, networks, servers, etc. using either wired or wireless media. All these components are well known in the art and need not be discussed at length here. Many other components might also be present.

Figure 5:
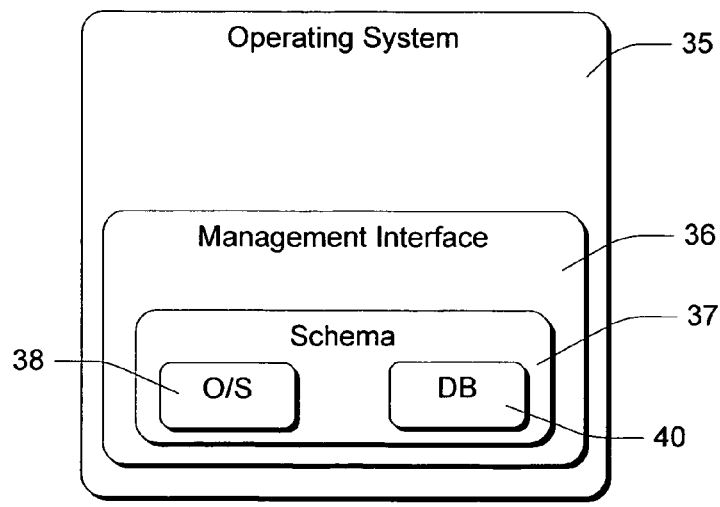
FIG. 5 illustrates an operating system and its computer management component, along with a schema that models the computer and operating system.

FIG. 5 is a logical representation of pertinent executable components and data structures relating to an operating system's management infrastructure. The elements shown in FIG. 5 might be maintained in a single computer, or might be maintained in a plurality of computers. They reside in various types of computer-readable memory. It should be noted that parts or all of the system might be implemented by something other than a conventional computer.

The example shown by FIG. 5 includes an operating system 35. The "Windows" brand of operating systems, available from Microsoft Corporation of Redmond, Wash., is one example of a suitable operating system.

The "Windows 2000" operating system includes a service known as "Windows Management Instrumentation" (WMI) 36. WMI is a management infrastructure for managing the operating system, applications, and computer hardware. It includes Microsoft's implementation of the Web-Based Enterprise Management (WBEM) initiative, an industry standard administered by the Distributed Management Task Force (DMTF). WMI provides an object-oriented way of monitoring, configuring and controlling systems, services, and applications on the Windows platform. WMI objects consist of classes and instances of classes. The WMI classes may be derived from standard classes defined in the Common Information Model (CIM). WMI provides services such as SQL query language support and programmable event notification.

To support CIM, WMI maintains a system management schema definition 37. In many cases, schema definition 37 is stored in the WMI repository. The schema contains a definition of the classes, along with the properties and methods of these classes. The classes in a schema may be declared in one or more namespaces.

System management schema 37 includes an operating system schema or subschema 38 that represents manageable components of a computer's operating system. The system management schema and its operating system subschema conform to the CIM definition, and possibly include CIM extensions or extension schemas. The namespace containing the operating schema 38 will be referred to herein as the operating system namespace.

In addition to the operating system schema 38, the inventors have developed a database schema or subschema 40 for use in conjunction with or as part of the system management schema 37 of WMI (or other management systems) to represent manageable components of an SQL (Structured Query Language) server. In particular, the database schema 40 represents components of the "Microsoft SQL Server," although a schema such as this can also support other databases.

The database schema 40 represents managed database objects such as tables, files, configuration data, and other logical components. The database schema is located in its own namespace, which will be referred to herein as the database namespace.

Figure 6:
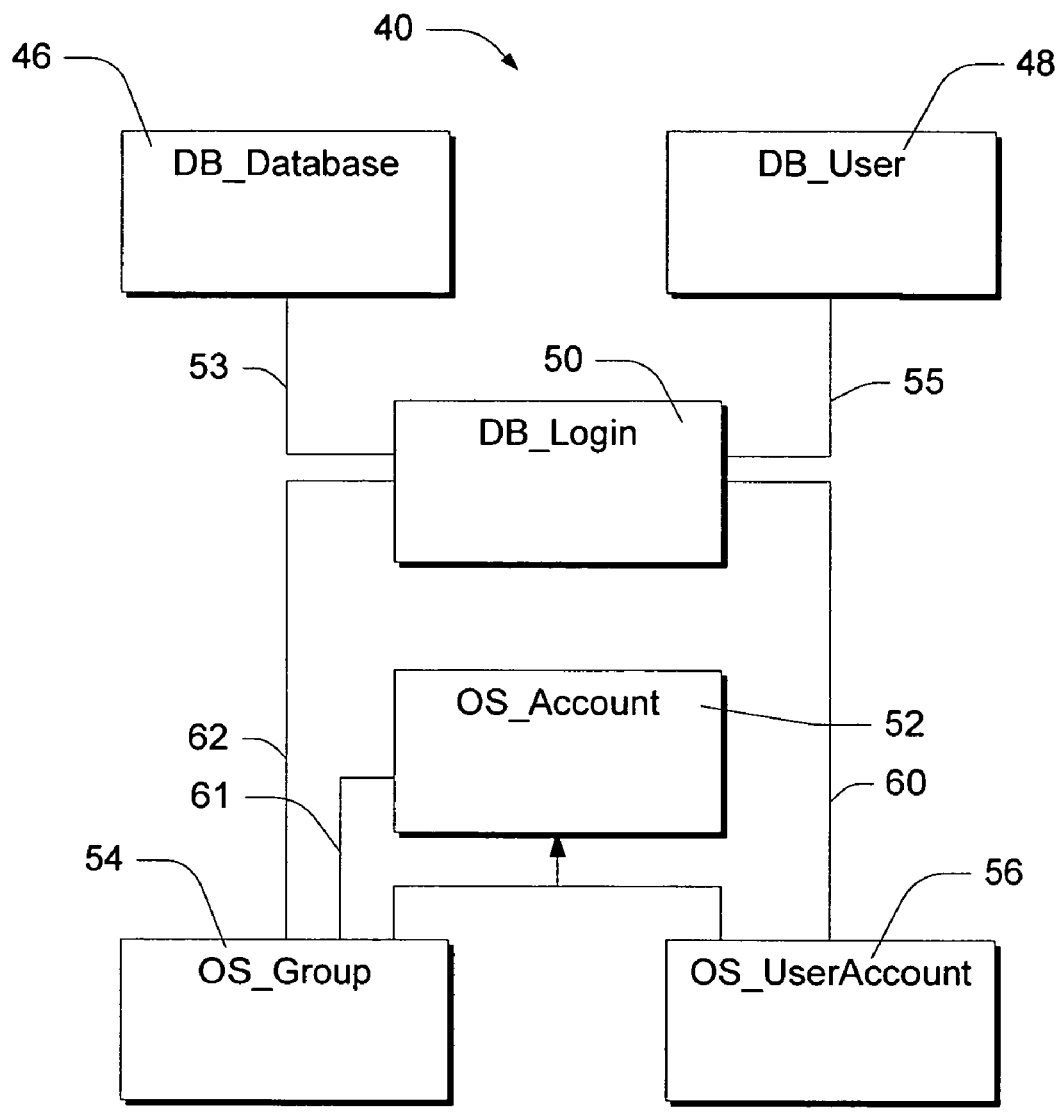
FIG. 6 shows portions of a database management schema, which contains a view of operating system classes.

FIG. 6 shows portions of database schema 40. The classes shown in FIG. 6 relate to files that are maintained by the operating system and by the managed database.

FIG. 6 shows only the pertinent classes and associations within the database namespace. The database namespace also includes other classes and associations (not shown) that are not pertinent to the invention. In addition, pertinent CIM or operating system classes from operating system schema 38 are represented in database management schema 40 by creating a "view," in the database namespace, of the appropriate operating system or CIM classes. A view is a mechanism by which one can "mirror" a class and its instances from another namespace. Creating views allows one to define associations and dependencies between CIM classes, without requiring cross-namespace association capabilities. Database management schema 40 includes classes related to the database itself. These classes are prefixed in FIG. 6 with "DB" and are part of a CIM extension. In addition, a view of certain parts of operating system schema 38 is created within namespace 42. Of these, FIG. 6 shows those operating system schema classes 11 related to computer and/or operating system users. These classes are prefixed with "OS" (equivalent classes in the Windows operating system are prefixed by "Win32").

The illustrated database-related classes include (a) a database class 46 (DB_Database), (b) a database user class 48 (DB_User), and (c) a database login class 50 (DB_Login). These are user-related classes that model information used for authentication of database users.

Database class 46, referred to as the DB_Database class in FIG. 6, represents instances of databases. Each database defines its owner and which users are allowed to access the database. An example of a database class defines properties, methods, and associations as follows:

Properties
  string Caption
    Access Type: Read-only
    Description: The Caption property is a short textual description (one-line string) of the object.
    Maximum Length: 64
  string Collation
    Access Type: Read/Write
    Description: The Collation property specifies the column-level collation of a string datatype in the database. A Collation setting for a Database object overrides the default collation specified in the model database. All tables in the database then inherit the Collation setting.
    SQL Server 2000 only
  uint32 CompatibilityLevel
    Access Type: Read/Write
    Description: The CompatibilityLevel property controlsMicrosoft® SQL Server™ behavior, setting behavior to match either the current or earlier version (default is 70).

| Value | Description |
| --- | --- |
| 0 | Unknown |
| 60 | SQL Server 6.0 |
| 65 | SQL Server 6.5 |
| 70 | SQL Server 7.0 |
| 80 | SQL Server 2000 | datetime CreateDate
    Access Type: Read-only
    Description: The CreateDate property indicates the time and date on which the database was created. Note that creation date may be different from the install date in cases where the object is created in one place and then installed elsewhere.
  boolean CreateForAttach
    Access Type: Read-only
    Description: The CreateForAttach property controls database file creation and specifies whether a database is attached from an existing set of operating system files.
  uint32 DatabaseStatus
  Access Type: Read-only
    Description: The DatabaseStatus property reflects the current operational status on the database. The database is inaccessible when the status is Loading, Offline, Recovering or Suspect.

| Value | Description |
| --- | --- |
| 0 | Normal |
| 32 | Loading |
| 192 | Recovering |
| 256 | Suspect |
| 512 | Offline |
| 1024 | Standby |
| 32768 | Emergency Mode | string Description
    Access Type: Read-only
    Description: The Description property provides a textual description of the object.
  boolean FullTextEnabled
    Access Type: Read-only
    Description: The FullTextEnabled property is TRUE when the referenced database has been selected for participation in Microsoft® Search full-text queries.
  datetime InstallDate
    Access Type: Read-only
    Description: The InstallDate property is datetime value indicating when the object was installed. A lack of a value does not indicate that the object is not installed.

[key] string Name
- Access Type: Read-only
- Description: The Name property defines the label by which the object is known.

string PrimaryFilePath
- Access Type: Read-only
- Description: ThePrimaryFilePath property returns the path and nameof the operating system directory containing the primary file for the database.

sint32 Size
- Access Type: Read-only
- Description: The Size property exposes the total size, in megabytes, of the database.
- Units: MegaBytes sint32 SpaceAvailable
- Access Type: Read-only
- Description: The SpaceAvailable property returns the amount of disk resource allocated in kilobytes and unused in operating systemfiles implementingMicrosoft® SQL Server™ database storage.

[key] string SQLServerName
- Access Type: Read-only
- Description: The SQLServerName property indicates the name of the SQL Server™ installation that the database is a part of.
- Maximum Length: 128 string Status
- Access Type: Read-only
- Description: The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
- Values are: "OK", "Error", "Degraded", "Unknown", "Pred Fail", "Starting", "Stopping", "Service"
- Maximum Length: 10 boolean SystemObject
- Access Type: Read-only
- Description: The SystemObject property indicates whether the object is owned by Microsoft®. A value of TRUE indicates that the object implementation is owned by Microsoft®.

sint32 Version
- Access Type: Read-only
- Description: The Version property returns a system-specified integer identifying the version of Microsoft® SQL Server™ used to create the referenced database.

Methods

| Method Name | Description |
| --- | --- |
| CheckAllocations | The CheckAllocations method scans all pages of the referenced Microsoft ® SQL Server ™ database, testing pages to ensure integrity. |
| CheckCatalog | The CheckCatalog method tests the integrity of the catalog of the referenced database. |
| CheckIdentityValues | The CheckIdentityValues method verifies the integrity of all identity columns in tables of the referenced database. |
| Checkpoint | The Checkpoint method forces a write of dirty database pages. |
| CheckTables | The CheckTables method tests the integrity of database pages implementing storage for all tables and indexes defined on the tables of the database. |
| CheckTablesDataOnly | The CheckTablesDataOnly method tests the integrity of database pages implementing storage for all tables in the referenced database. |
| Create | The Create method is used to create a new database. |
| DisableFullTextCatalogs | The DisableFullTextCatalogs method suspends Microsoft ® Search full-text catalog maintenance on the database. |
| EnableFullTextCatalogs | The EnableFullTextCatalogs method enables Microsoft ® Search full-text indexing on the referenced Microsoft ® SQL Server ™ database. |
| EnumerateStoredProcedures | The EnumerateStoredProcedures method searches stored procedures and returns those that contain a specified string. |
| ExecuteImmediate | The ExecuteImmediate method allows any SQL Server ™ command to be executed, as long as the command doesn't return result sets. |
| FullTextIndexScript | The FullTextIndexScript method returns a Transact-SQL command batch enabling Microsoft ® Search full-text indexing on a database or table. |
| IsValidKeyDatatype | The IsValidKeyDatatype method returns TRUE when the data type specified can participate in a PRIMARY KEY or FOREIGN KEY constraint. |

-continued

| Method Name | Description |
|---|---|
| RecalcSpaceUsage | The RecalcSpaceUsage method forces the update of data reporting the disk resource usage of the referenced Microsoft ® SQL Server ™ database. |
| RemoveFullTextCatalogs | The RemoveFullTextCatalogs method drops all Microsoft ® Search full-text catalogs supporting full-text query on a Microsoft ® SQL Server ™ database. |
| Rename | The Rename method is used to rename the database instance. |
| Shrink | The Shrink method attempts to reduce the size of all operating system files maintaining the database. |
| Transfer | The Transfer method copies database schema and/or data from one Microsoft ® SQL Server ™ database to another. |
| UpdateIndexStatistics | The UpdateIndexStatistics method forces data distribution statistics update for all indexes on user-defined tables in the referenced Microsoft ® SQL Server ™ database. |

Associations (only associations shown in FIG. 6 are listed)
DB_Database is associated to DB_Login as the Container property of a DB_DatabaseLogin association 53.

User class 48 represents database users. This class exposes the attributes of a single database user. The properties, associations, and methods of this class, referred to as the "DB_User" class, are listed below.
Properties
string Caption
Access Type: Read-only
Description: The Caption property is a short textual description (one-line string) of the object.
Maximum Length: 64
[key] string DatabaseName
Access Type: Read-only
Description: The DatabaseName property indicates the name of the database that the user is a part of.
Maximum Length: 128
string Description
Access Type: Read-only
Description: The Description property provides a textual description of the object.
datetime InstallDate
Access Type: Read-only
Description: The InstallDate property is datetime value indicating when the object was installed. A lack of a value does not indicate that the object is not installed.
[key] string Name
Access Type: Read-only
Description: The Name property defines the label by which the user is known.
[key] string SQLServerName
Access Type: Read-only
Description: The SQLServerName property indicates the name of the SQL Server™ installation that the object is a part of.
Maximum Length: 128
string Status
Access Type: Read-only
Description: The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
Values are: "OK", "Error", "Degraded", "Unknown", "Pred Fail", "Starting", "Stopping", "Service"
Maximum Length: 10
boolean SystemObject
Access Type: Read-only
Description: The SystemObject property indicates whether the object is owned by Microsoft®. A value of True indicates that the object implementation is owned by Microsoft®.
Methods

| Method Name | Description |
|---|---|
| Create | The Create method is used to create a new user. |

Associations (only associations shown in FIG. 6 are listed)
DB_User is associated to DB_Login as the Dependent property of a DB_UserLogin association 55.

Login class 50 represents the login authentication records present in a database server installation. The properties, associations, and methods of this class, referred to as the "DB_login" class, are listed below.
Properties
string Caption
Access Type: Read-only
Description: The Caption property is a short textual description (one-line string) of the object.
Maximum Length: 64
string Description
Access Type: Read-only
Description: The Description property provides a textual description of the object.
datetime InstallDate
Access Type: Read-only
Description: The InstallDate property is datetime value indicating when the object was installed. A lack of a value does not indicate that the object is not installed.

string Language
   Access Type: Read/Write
   Description: The Language property indicates the language used for a client connection using the login.
[key] string Name
   Access Type: Read-only
   Description: The Name property defines the label by which the object is known. In order to use Windows NT authentication, the name of the login must be a valid NT account name in the form \\ServerName\UserName.
[key] string SQLServerName
   Access Type: Read-only
   Description: The SQLServerName property indicates the name of the SQL Server™ installation that the object is a part of.
   Maximum Length: 128
string Status
   Access Type: Read-only
   Description: The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.
   Values are: "OK", "Error", "Degraded", "Unknown", "Pred Fail", "Starting", "Stopping", "Service"
   Maximum Length: 10
boolean SystemObject
   Access Type: Read-only
   Description: The SystemObject property indicates whether the object is owned by Microsoft®. A value of True indicates that the object implementation is owned by Microsoft®.
Methods

| Method Name | Description |
| --- | --- |
| GetUserName | The GetUserName method returns the database user used by the referenced login, when a connection using that login accesses the specified database. |
| SetPassword | The SetPassword method is used to set the password for a login that uses SQL Server ™ authentication. |

Associations (only associations shown in FIG. 6 are listed)
   DB_Login is associated to DB_User as the Antecedent property of a DB_UserLogin association 55.
   DB_Login is associated to DB_Database as the Containee property of a DB_DatabaseLogin association 53.
Database/login association 53, between database class 46 and login class 50, associates a database instance with the login record that owns the database. Login/user association 55, between user class 48 and login class 50, associates individual users with different login records.
The operating system portion of the schema, a view of which is contained within the database management schema 40, comprises one or more classes: an operating system account superclass 52, an operating system group account class 54, and an operating system user account class 56. These are user-related account classes that model information used by the operating system to authenticate computer users. The "Windows 2000" operating system is an example of an operating system that authenticates users. Each authorized user has a specific operating system account, and optionally belongs to a specific operating system group of users. Operating system privileges are granted either to individual user accounts or to groups of users.

The operating system account class 52 contains information about user accounts and group accounts known to the operating system. User or group names recognized by an operating system are descendents (or members) of this class. The Windows implementation of this class is called "OS_Account." Its properties and associations are listed below:
Properties
string Caption
   Access Type: Read-only
   Description: The Caption property is a short textual description (one-line string) of the object.
   Maximum Length: 64
string Description
   Access Type: Read-only
   Description: The Description property provides a textual description of the object.
[key] string Domain
   Access Type: Read-only
   Description: The Domain property indicates the name of the Windows domain to which a group or user belongs. Example: NA-SALES
datetime InstallDate
   Access Type: Read-only
   Description: The InstallDate property is datetime value indicating when the object was installed. A lack of a value does not indicate that the object is not installed.
[key] string Name
   Access Type: Read-only
   Description: The Name property indicates the name of the OS system account on the domain specified by the Domain member of this class.
string SID
   Access Type: Read-only
   Description: The SID property contains the security identifier (SID) for this account. a SID is a string value of variable length used to identify a trustee. Each account has a unique SID issued by an authority (such as a Windows domain), stored in a security database. When a user logs on, the system retrieves the user's SID from the database and places it in the user's access token. The system uses the SID in the user's access token to identify the user in all subsequent interactions with Windows security. When a SID has been used as the unique identifier for a user or group, it cannot be used again to identify another user or group.
uint8 SIDType
   Access Type: Read-only
   Description: The SIDType property contains enumerated values that specify the type of security identifier (SID).

| Value | Description | Explanation |
|---|---|---|
| 1 | SidTypeUser | Indicates a user SID. |
| 2 | SidTypeGroup | Indicates a group SID. |
| 3 | SidTypeDomain | Indicates a domain SID. |
| 4 | SidTypeAlias | Indicates an alias SID. |
| 5 | SidTypeWellKnownGroup | Indicates a SID for a well-known group. |
| 6 | SidTypeDeletedAccount | Indicates a SID for a deleted account. |
| 7 | SidTypeInvalid | Indicates an invalid SID. |
| 8 | SidTypeUnknown | Indicates an unknown SID type. |
| 9 | SidTypeComputer | Indicates a SID for a computer. | string Status

Access Type: Read-only

Description: The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10

Associations (only associations shown in FIG. 6 are listed)

OS_Account is associated to OS_Group as the Part Component property of an OS_GroupUser association 61.

The operating system group account class 54 represents data about a group account in the operating system. A group account allows access privileges to be changed for a list of users. Shown below are the properties and associations of a Windows implementation of account class 52, named "OS_Group":

Properties string Caption

Access Type: Read-only

Description: The Caption property is a short textual description (one-line string) of the object.

Maximum Length: 64 string Description

Access Type: Read-only

Description: The Description property provides a textual description of the object.

[key] string Domain

Access Type: Read-only

Description: The Domain property indicates the name of the Windows domain to which the group account belongs. Example: NA-SALES datetime InstallDate Access Type: Read-only Description: The InstallDate property is datetime value indicating when the object was installed. A lack of a value does not indicate that the object is not installed.

[key] string Name

Access Type: Read-only

Description: The Name property indicates the name of the OS group account on the domain specified by the Domain member of this class.

string SID

Access Type: Read-only

Description: The SID property contains the security identifier (SID) for this account. a SID is a string value of variable length used to identify a trustee. Each account has a unique SID issued by an authority (such as a Windows domain), stored in a security database. When a user logs on, the system retrieves the user's SID from the database and places it in the user's access token. The system uses the SID in the user's access token to identify the user in all subsequent interactions with Windows security. When a SID has been used as the unique identifier for a user or group, it cannot be used again to identify another user or group.

uint 8 SIDType

Access Type: Read-only

Description: The SIDType property contains enumerated values that specify the type of security identifier (SID).

| Value | Description | Explanation |
|---|---|---|
| 1 | SidTypeUser | Indicates a user SID. |
| 2 | SidTypeGroup | Indicates a group SID. |
| 3 | SidTypeDomain | Indicates a domain SID. |
| 4 | SidTypeAlias | Indicates an alias SID. |
| 5 | SidTypeWellKnownGroup | Indicates a SID for a well-known group. |
| 6 | SidTypeDeletedAccount | Indicates a SID for a deleted account. |
| 7 | SidTypeInvalid | Indicates an invalid SID. |
| 8 | SidTypeUnknown | Indicates an unknown SID type. |
| 9 | SidTypeComputer | Indicates a SID for a computer. | string Status

Access Type: Read-only

Description: The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10

Associations (only associations shown in FIG. 6 are listed)

OS_Group is associated to OS_Account as the GroupComponent property of the OS_GroupUser association.

The operating system user account class 56, referred to in FIG. 6 as "OS_UserAccount," contains information about user accounts known to the operating system. Its properties are listed below:

Properties uint32 AccountType

Access Type: Read-only

Description: The AccountType property contains flags describing the characteristics of a OS user account

| Bit Position | Description | Explanation |
| --- | --- | --- |
| 8 | Temporary duplicate account | Local user account for users whose primary account is in another domain. This account provides user access to this domain, but not to any domain that trusts this domain. |
| 9 | Normal account | Default account type that representing a typical user. |
| 11 | Interdomain trust account | Account is for a system domain that trusts other domains. |
| 12 | Workstation trust account | This is a computer account for a Windows NT/Windows 2000 machine that is a member of this domain. |
| 13 | Server trust account | Account is for a system backup domain controller that is a member of this domain. | string Caption

Access Type: Read-only

Description: The Caption property is a short textual description (one-line string) of the object.

Maximum Length: 64 string Description

Access Type: Read-only

Description: The Description property provides a textual description of the object.

boolean Disabled

Access Type: Read-only

Description: The Disabled property determines whether the OS user account is disabled. Values: TRUE or FALSE. If TRUE, the user account is disabled.

[key] string Domain

Access Type: Read-only

Description: The Domain property indicates the name of the Windows domain to which the user account belongs. Example: NA-SALES string FullName Access Type: Read-only Description: The FullName property indicates the full name of the local user. Example: Thomas Williams datetime InstallDate Access Type: Read-only Description: The InstallDate property is datetime value indicating when the object was installed. A lack of a value does not indicate that the object is not installed.

boolean Lockout

Access Type: Read-only

Description: The Lockout property determines whether the user account is locked out of the OS system. Values: TRUE or FALSE. If TRUE, the user account is locked out.

[key] string Name

Access Type: Read-only

Description: The Name property indicates the name of the OS user account on the domain specified by the Domain member of this class. Example: thomasw boolean PasswordChangeable Access Type: Read-only Description: The PasswordChangeable property determines whether the password on the OS user account can be changed. Values: TRUE or FALSE. If TRUE, the password can be changed.

boolean PasswordExpires

Access Type: Read-only

Description: The PasswordExpires property determines whether the password on the OS user account will expire. Values: TRUE or FALSE. If TRUE, the password will expire.

boolean PasswordRequired

Access Type: Read-only

Description: The PasswordRequired property determines whether a password is required on the OS user account. Values: TRUE or FALSE. If TRUE, a password is required.

string SID

Access Type: Read-only

Description: The SID property contains the security identifier (SID) for this account. a SID is a string value of variable length used to identify a trustee. Each account has a unique SID issued by an authority (such as a Windows domain), stored in a security database. When a user logs on, the system retrieves the user's SID from the database and places it in the user's access token. The system uses the SID in the user's access token to identify the user in all subsequent interactions with Windows security. When a SID has been used as the unique identifier for a user or group, it cannot be used again to identify another user or group.

uint8 SIDType

Access Type: Read-only

The SIDType property contains enumerated values that specify the type of security identifier (SID).

| Value | Description | Explanation |
| --- | --- | --- |
| 1 | SidTypeUser | Indicates a user SID. |
| 2 | SidTypeGroup | Indicates a group SID. |
| 3 | SidTypeDomain | Indicates a domain SID. |
| 4 | SidTypeAlias | Indicates an alias SID. |
| 5 | SidTypeWellKnownGroup | Indicates a SID for a well-known group. |
| 6 | SidTypeDeletedAccount | Indicates a SID for a deleted account. |
| 7 | SidTypeInvalid | Indicates an invalid SID. |
| 8 | SidTypeUnknown | Indicates an unknown SID type. |
| 9 | SidTypeComputer | Indicates a SID for a computer. | string Status

Access Type: Read-only

The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10

User account class 56 and group account class 54 are subclasses of operating system account superclass 52.

In addition to the associations listed above, the inventors have discovered that it would be advantageous to associate database user logins with operating system users or groups. To that end, they have created associations between the two schemas: an association 60 that maps operating system user accounts 56 to their database logins 50, and an association 62 that maps operating system groups 54 to their database logins 50. More specifically, DB_Login is associated to OS_UserAccount as the Dependent property of a DB_LoginOSUserAccount association 60. DB_Login is associated to OS_Group as the Dependent property of a DB_LoginOSGroup association 62.

Furthermore, the system management schema 37 appropriately models a database in which users can login using two different types of authentication: OS authentication or database server authentication. This is controlled by a property of DB_Database class 46 called "Type":

uint32 Type

Access Type: Read/Write

Description: The Type property indicates the type of authentication used. The authentication can be NT authentication, or SQL Server™ authentication. For NT authentication, the login can use the name of a user or a group.

| Value | Description |
|---|---|
| 0 | Other NT User Authentication |
| 1 | NT Group Authentication |
| 2 | SQL Server ™ Authentication |

DB_Database class 46 includes a further property, called "DenyNTLogin", that indicates the ability to access to a SQL Server™ installation for login records identifying Windows NT users or groups:

boolean DenyNTLogin

Access Type: Read/Write

Description: The DenyNTLogin property indicates the ability to access to a SQL Server™ installation for login records identifying Windows NT users or groups. When True, any Windows NT authenticated connection attempt specifying the user or group name fails authentication. When False, the Windows NT user or group is allowed access to the SQL Server™ installation on which the login is defined. Use DenyNTLogin to specifically deny access to Windows NT users and groups.

Because of association 60 and 62, the WMI management system is able to addresses the potential difficulties of using disparate mechanisms to manage different applications. For example, in order to manage an enterprise, one needs to manage not only the database server, but also the operating system running on the machines, the e-mail servers, the web servers, etc. In order to deploy a reliable 11 system that includes all such components, one needs the ability to manage and troubleshoot across these applications. Having a common interface for each of these components and allowing system administrators (as well as third party management applications) to seamlessly navigate from one subsystem to another, is a huge leap in making an enterprise more manageable.

Specifically, the schemas described above allow a system administrator to submit queries that map between users defined in databases, and users defined in the operating system. This type of information greatly improves the efficiency with which a system can be managed.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims.

What is claimed is:

1. A computer having at least one processing unit, the computer comprising:

means for modeling an operating system with an operating system schema in a first namespace;

means for modeling a database with a database schema in a second namespace;

means for representing user-related operating system information by an user-related operating system class in the operating system schema;

means for representing user-related database information by a user-related database class in the database schema;

means for creating a view of the operating system schema within the second namespace; and means for creating an association in the second namespace between the operating system user-related class and the database user-related class, said association allowing queries that navigate between the operating system file class and the database file class.

2. A computer as recited in claim 1, wherein the operating system schema is a CIM schema.

3. A computer as recited in claim 1, wherein the database schema is a CIM extension.

4. A computer as recited in claim 1, wherein the operating system schema is a CIM schema and the database schema is a CIM extension.

5. One or more computer storage having computer-executable instructions for performing steps comprising:

modeling an operating system with an operating system schema in a first namespace;

modeling a database with a database schema in a second namespace;

representing user-related operating system information by an user-related operating system class in the operating system schema;

representing user-related database information by a user-related database class in the database schema;

creating a view of the operating system schema within the second namespace; and creating an association in the second namespace between the operating system user-related class and the database user-related class, said association allowing queries that navigate between the operating system file class and the database file class.

6. One or more computer storage media as recited in claim 1, wherein the operating system schema is a CIM schema.

7. One or more computer storage media as recited in claim 1, wherein the database schema is a CIM extension.

8. One or more computer storage media as recited in claim 1, wherein the operating system schema is a CIM schema and the database schema is a CIM extension.

* * * * *

UNITED STATES PATENT AND TRADEMARK OFFICE
CERTIFICATE OF CORRECTION

PATENT NO.        : 6,990,499 B2                                            Page 1 of 1
APPLICATION NO.   : 10/966177
DATED             : January 24, 2006
INVENTOR(S)       : Kagalwala et al.

It is certified that error appears in the above-identified patent and that said Letters Patent is hereby corrected as shown below:

In column 3, line 52, after "CD-ROM," delete "is".

In column 5, line 43, after "classes" delete "11".

In column 7, line 7, delete "ThePrimaryFilePath" and insert -- The PrimaryFilePath --, therefor.

In column 7, line 8, delete "nameof" and insert -- name of --, therefor.

In column 12, line 51, after "account." delete "a" and insert -- A --, therefor.

In column 14, line 11, after "account." delete "a" and insert -- A --, therefor.

In column 16, line 27, after "account." delete "a" and insert -- A --, therefor.

In column 17, line 63, after "reliable" delete "11".

In column 18, line 42, in Claim 5, after "storage" insert -- media --.

In column 18, line 60, in Claim 6, delete "1," and insert -- 5, --, therefor.

In column 18, line 62, in Claim 7, delete "1," and insert -- 5, --, therefor.

In column 18, line 64, in Claim 8, delete "1," and insert -- 5, --, therefor.

Signed and Sealed this

Thirteenth Day of April, 2010

David J. Kappos
*Director of the United States Patent and Trademark Office*